U S010489839B2

US 10,489,839 B2

(12) United States Patent
Ouyang

(10) Patent No.: US 10,489,839 B2
(45) Date of Patent: Nov. 26, 2019

(54) INFORMATION PRESENTATION METHOD AND INFORMATION PRESENTATION APPARATUS

(71) Applicant: Tencent Technology (Shenzhen) Company Limited, Shenzhen, Guangdong (CN)

(72) Inventor: Ting Ouyang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 15/663,354

(22) Filed: Jul. 28, 2017

(65) Prior Publication Data
US 2017/0330261 A1 Nov. 16, 2017

Related U.S. Application Data

(63) Continuation of application No. PCT/CN2016/106358, filed on Nov. 18, 2016.

(30) Foreign Application Priority Data

Nov. 25, 2015 (CN) .......................... 2015 1 0833256

(51) Int. Cl.
G06Q 30/00 (2012.01)
G06Q 30/06 (2012.01)
(Continued)

(52) U.S. Cl.
CPC ..... *G06Q 30/0627* (2013.01); *H04N 21/4722* (2013.01); *H04N 21/858* (2013.01)

(58) Field of Classification Search
CPC .................. G06Q 30/0627; H04N 21/4722
(Continued)

(56) References Cited

U.S. PATENT DOCUMENTS 10,121,171 B1 * 11/2018 Chang ................ G06Q 30/0282
10,242,395 B1 * 3/2019 Manjunathaiah .. G06Q 30/0623
(Continued)

FOREIGN PATENT DOCUMENTS

CN 102855237 A 1/2013
CN 102855273 A 1/2013
(Continued)

OTHER PUBLICATIONS

"Digital Libraries with Superimposed Information: Supporting Scholarly Tasks that Involve Fine Grain Information." Murthy, Uma. ProQuest Dissertations and ThesesProQuest Dissertations Publishing. (2011); Dialog #1020380941; 187pgs. (Year: 2011).*
(Continued)

*Primary Examiner* — Robert M Pond
(74) *Attorney, Agent, or Firm* — Brinks Gilson & Lione

(57) ABSTRACT

This application provides an information presentation method, including: receiving an image presentation request from a presentation client; obtaining an image and text presentation information corresponding to the image from a product promotion platform according to image information, the text presentation information being used to present comment information, posted by different users, of a product in the image; performing superimposition processing on the text presentation information and the image to obtain a presentation image; and sending the presentation image to the presentation client for a presentation operation. This application further provides an information presentation apparatus. According to the information presentation method and the information presentation apparatus in this application, text presentation information and an image are synthesized for presentation, thereby improving presentation efficiency of the text presentation information, and enriching presentation manners and presentation content.

18 Claims, 12 Drawing Sheets

(51) Int. Cl.
*H04N 21/4722* (2011.01)
*H04N 21/858* (2011.01)

(58) Field of Classification Search
USPC .................................................. 705/26, 27
See application file for complete search history.

(56) References Cited

U.S. PATENT DOCUMENTS

| | | | |
|---|---|---|---|
| 10,248,991 B1* | 4/2019 | Cheung | G06Q 30/0643 |
| 2002/0010655 A1* | 1/2002 | Kjallstrom | G06Q 30/02 |
| | | | 705/26.62 |
| 2013/0066873 A1* | 3/2013 | Salvetti | G06Q 30/0278 |
| | | | 707/738 |
| 2014/0079337 A1* | 3/2014 | Kondo | G06T 3/40 |
| | | | 382/276 |
| 2015/0082249 A1 | 3/2015 | Kim et al. | |

FOREIGN PATENT DOCUMENTS

| | | |
|---|---|---|
| CN | 104050568 A | 9/2014 |
| CN | 104504063 A | 4/2015 |
| CN | 105512187 A | 4/2016 |

OTHER PUBLICATIONS

International Search Report and Written Opinion dated Feb. 13, 2017 for PCT Application No. PCT/CN2016/106358, 11 pages.
Office Action dated Jun. 12, 2019 for Chinese Application No. 201510833256.5 with concise English Translation, 10 pages.

* cited by examiner

INFORMATION PRESENTATION METHOD AND INFORMATION PRESENTATION APPARATUS

RELATED APPLICATION

This application is a continuation application of PCT Patent Application No. PCT/CN2016/106358, filed on Nov. 18, 2016, which claims priority to Chinese Patent Application No. 201510833256.5, filed with the Chinese Patent Office on Nov. 25, 2015, both of which are incorporated herein by reference in their entireties.

FIELD OF TECHNOLOGY

This application relates to the field of Internet, and in particular, to an information presentation method and an information presentation apparatus.

BACKGROUND OF THE DISCLOSURE

In recent years, the amount of e-commerce transactions is growing at a relatively fast speed. Product comments corresponding to a commodity on an e-commerce platform may provide the most direct feedbacks of the commodity to consumers. Before buying a commodity, a user usually reads product comments corresponding to the commodity to obtain more information about the commodity.

SUMMARY

Embodiments of this application provide an information presentation method and an information presentation apparatus, to improve information presentation efficiency, and provide rich information presentation manners.

An embodiment of this application provides an information presentation method, including:

receiving, by an information presentation apparatus comprising a memory and a processor in communication with the memory, an image presentation request from a presentation client, the presentation client being configured to present an image, and the image presentation request comprising image information corresponding to the image;

obtaining, by the information presentation apparatus, the image and text presentation information corresponding to the image from a product promotion platform according to the image information, the text presentation information being used to present comment information of a product in the image;

performing, by the information presentation apparatus, superimposition processing on the text presentation information and the image to obtain a presentation image; and sending, by the information presentation apparatus, the presentation image to the presentation client for a presentation operation.

An embodiment of this application further provides an information presentation apparatus, including:

a memory storing instructions; and a processor in communication with the memory, wherein, when the processor executes the instructions, the processor is configured to cause the information presentation apparatus to:

receive an image presentation request from a presentation client, the presentation client being configured to present an image, and the image presentation request comprising image information corresponding to the image;

obtain the image and text presentation information corresponding to the image from a product promotion platform according to the image information, the text presentation information being used to present comment information of a product in the image;

perform superimposition processing on the text presentation information and the image to obtain a presentation image; and send the presentation image to the presentation client for a presentation operation.

According to the information presentation method and the information presentation apparatus that are provided in the embodiments of this application, comment information, posted by different users, of a product is synthesized on a corresponding image for presentation, thereby improving presentation efficiency of the product comment information, enriching presentation manners and presentation content, and resolving technical problems that presentation efficiency of an existing product comment information presentation method and comment information presentation apparatus is relatively low, and presentation manners and presentation content are relatively simple.

DESCRIPTION OF EMBODIMENTS

Figure 1:
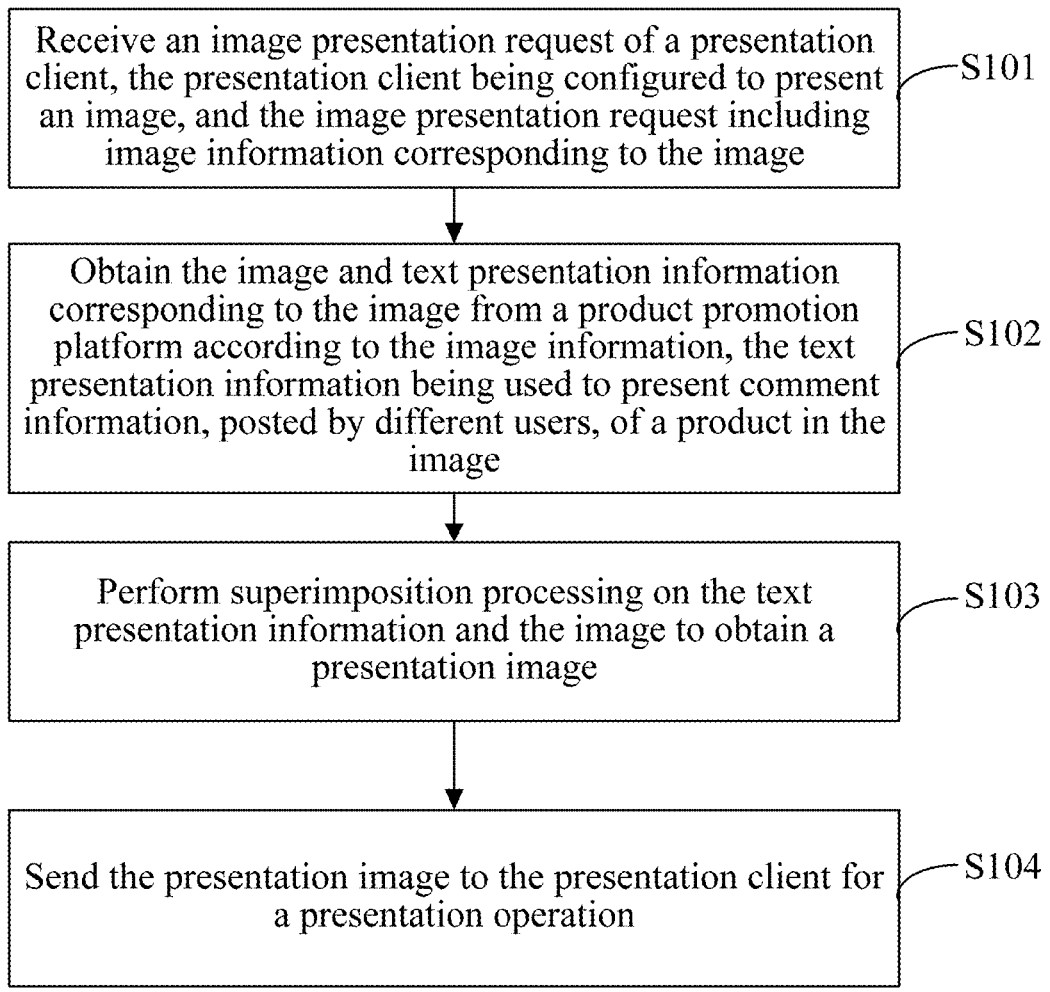
FIG. 1 is a flowchart of an information presentation method according to an embodiment of this application.

Referring to the drawings, same component symbols represent same components. A principle of this application is described by using examples in which this application is implemented in proper computing environments. The following descriptions are specific embodiments of this application based on the examples, and should not be construed as a limitation to other specific embodiments of this application that are not described herein in detail.

In the following description, the specific embodiments of this application are described with reference to steps and signs of operations that are performed by one or more computers, unless indicated otherwise. Therefore, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by persons skilled in the art. The data structures in which data is maintained are physical locations of the memory that have particular properties defined by the format of the data. However, while the principle of this application is being described in the foregoing text, it is not meant to be limiting as a person skilled in the art will appreciate that the various steps and operations described hereinafter may be implemented in hardware.

The information presentation apparatus in this application may be implemented by using various electronic devices, that includes a CPU or processor and a memory in communication with the processor, wherein the memory has stored therein executable instructions for the processor. The electronic device includes, but is not limited to: a personal computer, a server computer, a portable or laptop device, a mobile device (for example, a mobile phone, a personal digital assistant (PDA), and a media player), a multiprocessor system, a consumption-based electronic device, a small computer, a mainframe computer, a distributed computing environment including any one of the foregoing systems or devices, and the like. In some embodiments, the electronic device is an e-commerce platform server, to effectively improve presentation efficiency of product comment information on related intelligent mobile terminals, and enrich presentation manners of product comment information on intelligent mobile terminal.

Currently, comments of commodities on main e-commerce platforms are presented on the lower part of a commodity presentation page. If a user views product comments by using a terminal with a small screen such as a mobile phone, the user needs to scroll down pages multiple times to view the product comments. Moreover, because the terminal with a small screen has a limited presentation area, the user also needs to repeatedly drag the page to view all product comments of the commodity in a process of viewing the product comments. Some merchants sell forged and fake commodities for a short time by taking advantage of the vulnerability that users may not carefully view product comments. In addition, existing commodity presentation information does not present related certification information. Consequently, users cannot conveniently obtain certification information of the merchants or commodities. Therefore, presentation efficiency of the existing product comment information is relatively low, and presentation manners and presentation content are relatively simple.

In view of this, an embodiment of this application provides an information presentation method. Referring to FIG. 1, FIG. 1 is a flowchart of an information presentation method according to an embodiment of this application. The information presentation method in this embodiment may be implemented by using the foregoing electronic device. The information presentation method includes the following steps:

Step S101: Receive an image presentation request of a presentation client, the presentation client being configured to present an image, and the image presentation request including image information corresponding to the image.

Step S102: Obtain the image and text presentation information corresponding to the image from a product promotion platform according to the image information, the text presentation information being used to present comment information, posted by different users, of a product in the image.

Step S103: Perform superimposition processing on the text presentation information and the image to obtain a presentation image.

Step S104: Send the presentation image to the presentation client for a presentation operation.

Detailed procedures of the steps of the information presentation method in this embodiment of this application are described in detail below.

In step S101, an information presentation apparatus receives the image presentation request of the presentation client. The presentation client herein is a client requesting to view the image. For example, a user views commodity images on an e-commerce platform by using the presentation client. The image presentation request is a request requesting to view the image. The image presentation request may include the image information such as a website of the corresponding image. Subsequently, step S102 is performed.

In step S102, the information presentation apparatus obtains the corresponding image according to the image information obtained in step S101, and then obtains the text presentation information corresponding to the image from the product promotion platform according to the image. The image herein may be a commodity image on the product promotion platform such as an e-commerce platform. The related text information may be commodity information (for example, prices or sizes), related certification information (for example, certification label information of a seller and certification label information of a commodity), and filtered or unfiltered product comment information (for example, positive comment information or negative comment information) that is posted by different users and that corresponds to the commodity image or the commodity. Subsequently, step S103 is performed.

In step S103, the information presentation apparatus performs superimposition processing on the text presentation information and the image that are obtained in step S102. That is, the text presentation information is directly disposed on the image. In some embodiments, the text presentation information is disposed in a position not affecting a presentation effect of the image, to obtain the corresponding presentation image. The text presentation information is used to present related information of the product in the image. Subsequently, step S104 is performed.

In step S104, the information presentation apparatus sends the presentation image obtained in step S103 to the presentation client for the presentation operation. In this way, a user may view the comment information related to the image while viewing the presentation image. Therefore, an operation that the user needs to view the comment information by performing another operation is avoided, thereby improving presentation efficiency of the comment information. In addition, the image has diversified presentation manners. Therefore, presentation manners of the comment information are also diversified by viewing the comment information by using the image.

In the information presentation method in this embodiment of this application, text presentation information is synthesized on a corresponding image for presentation, thereby improving presentation efficiency of the text presentation information, enriching presentation manners, and preventing information release of forged and fake commodities relatively well.

Figure 2:
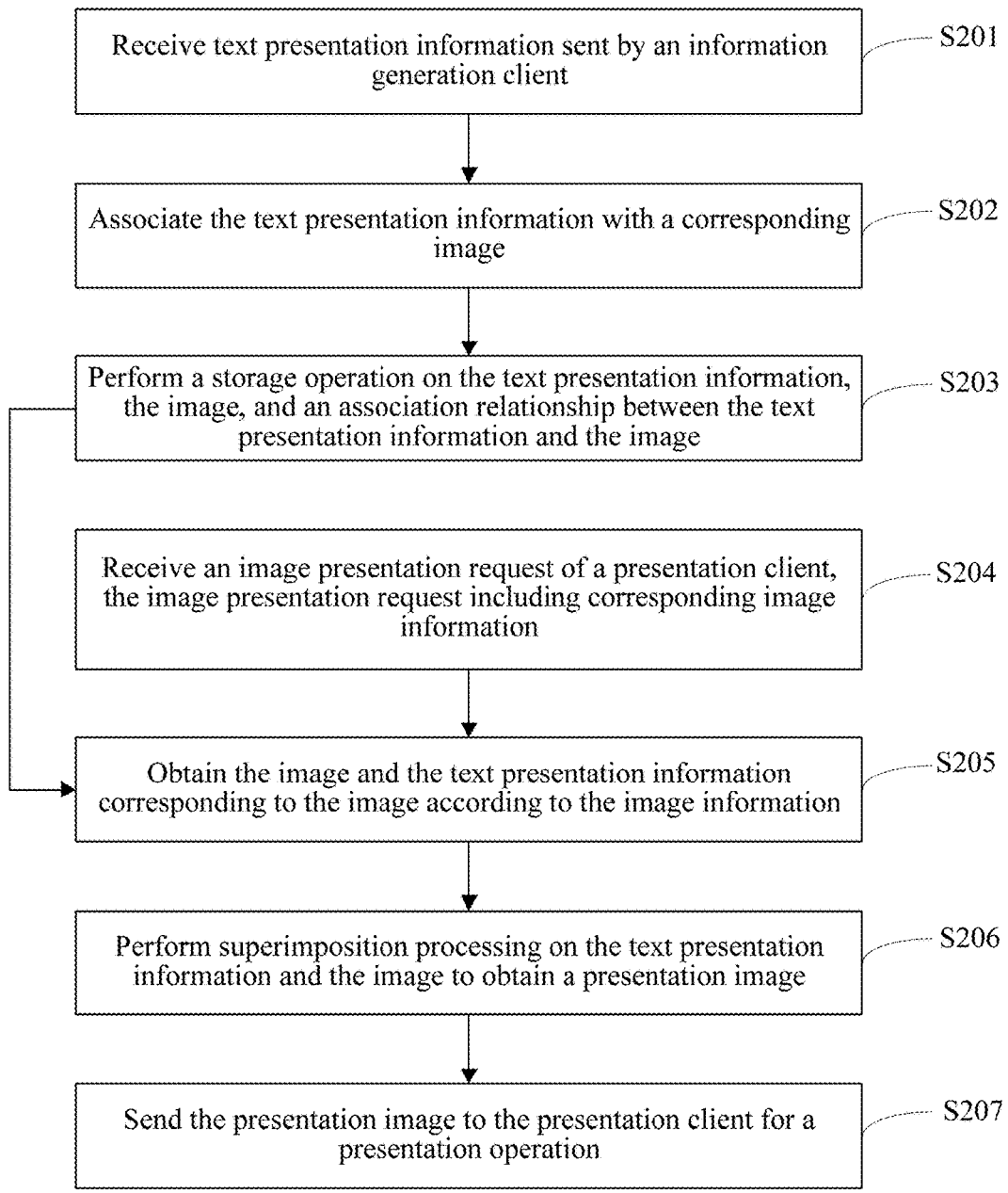
FIG. 2 is another flowchart of an information presentation method according to an embodiment of this application.

Referring to FIG. 2, FIG. 2 is another flowchart of an information presentation method according to an embodiment of this application. The information presentation method in this embodiment may be implemented by using the foregoing electronic device. The information presentation method includes the following steps:

Step S201: Receive text presentation information sent by an information generation client.

Step S202: Associate the text presentation information with a corresponding image.

Step S203: Perform a storage operation on the text presentation information, the image, and an association relationship between the text presentation information and the image.

Step S204: Receive an image presentation request of a presentation client, the image presentation request including corresponding image information.

Step S205: Obtain the image and the text presentation information corresponding to the image according to the image information.

Step S206: Perform superimposition processing on the text presentation information and the image to obtain a presentation image.

Step S207: Send the presentation image to the presentation client for a presentation operation.

Detailed procedures of the steps of the information presentation method in this embodiment are described in detail below.

In step S201, an information presentation apparatus receives the text presentation information sent by the information generation client. The information generation client is a client sending the text presentation information. If a user posts corresponding product comment information of a commodity image on an e-commerce platform by using the information generation client, the text presentation information may be the foregoing product comment information. Subsequently, step S202 is performed.

In step S202, the information presentation apparatus associates the text presentation information obtained in step S201 with the corresponding image, so as to rapidly find the text presentation information according to the image. Subsequently, step S203 is performed.

In step S203, the information presentation apparatus performs a storage operation on the text presentation information, the image, and the association relationship between the text presentation information and the image. Subsequently, step S205 is performed.

In step S204, the information presentation apparatus receives the image presentation request of the presentation client. The presentation client herein is a client requesting to view the image. For example, a user views commodity images on an e-commerce platform by using the presentation client. The image presentation request is a request requesting to view the image. The image presentation request may include the image information such as a website of the corresponding image. Subsequently, step S205 is performed.

In step S205, the information presentation apparatus obtains the corresponding image according to the image information obtained in step S204; and subsequently, obtains the text presentation information corresponding to the image according to the image and the text presentation information, the image, and the association relationship between the text presentation information and the image that are stored in step S203. The image herein may be a commodity image on an e-commerce platform. The text presentation information may be commodity information (for example, prices or sizes), related certification information (for example, certification label information of a seller and certification label information of a commodity), and filtered or unfiltered product comment information (for example, positive comment information or negative comment information) that corresponds to the commodity image or the commodity.

Figure 3:
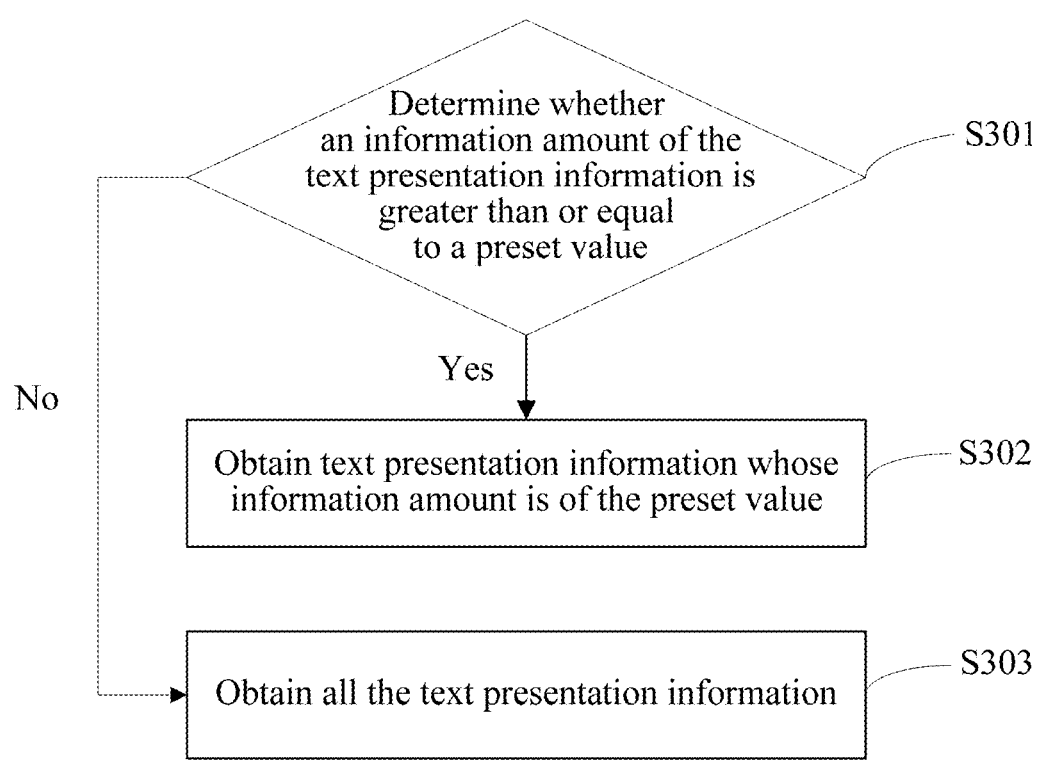
FIG. 3 is a flowchart of step S205 of an information presentation method according to an embodiment of this application.

For details, refer to FIG. 3. FIG. 3 is a flowchart of step S205 of an information presentation method according to an embodiment of this application. Step S205 includes the following steps:

Step S301: Determine whether an information amount of text presentation information is greater than or equal to a preset value; if the information amount of the text presentation information is greater than or equal to the preset value, go to step S302; and if the information amount of the text presentation information is less than the preset value, go to step S303.

Step S302: If the information amount of the text presentation information is greater than or equal to the preset value, the information amount of the text presentation information is too large, and the text presentation information cannot be completely presented by using a presentation image. Therefore, obtain text presentation information whose information amount is of the preset value. The preset value herein may be set according to a specific requirement of a user or a maintenance engineer of an e-commerce platform. To improve effectiveness of the text presentation information, an information presentation apparatus preferentially obtains text presentation information nearest to a current time.

Step S303: If the information amount of the text presentation information is less than the preset value, the information presentation apparatus obtains all the text presentation information. Subsequently, step S206 is performed.

Figure 4:
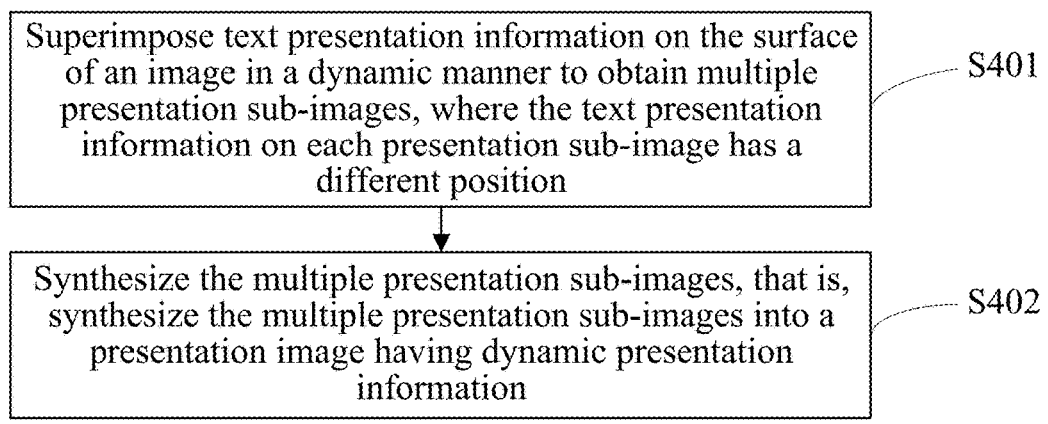
FIG. 4 is a flowchart of step S206 of an information presentation method according to an embodiment of this application.

In step S206, the information presentation apparatus performs superimposition processing on the text presentation information and the image that are obtained in step S205. That is, the text presentation information is directly disposed on the image to obtain the corresponding presentation image. The text presentation information is used to present related information of the product in the image. For details, refer to FIG. 4. FIG. 4 is a flowchart of step S206 of an information presentation method according to an embodiment of this application. Step S206 includes the following steps:

Step S401: The information presentation apparatus superimposes the text presentation information on the surface of the image in a dynamic manner to obtain multiple presentation sub-images, where the text presentation information on each presentation sub-image has a different position. In some embodiments, if the text presentation information is too much, and cannot be completely presented on the image once, the text presentation information may be divided into multiple presentation information groups. Subsequently, text presentation information in each presentation information group is superimposed on the surface of the image in a dynamic manner to obtain multiple presentation sub-images corresponding to the presentation information group. Subsequently, step S402 is performed.

Step S402: Synthesize the multiple presentation sub-images, that is, synthesize the multiple presentation sub-images into a presentation image having dynamic presentation information. Presentation information on each presentation image has a different position. Therefore, the text presentation information in the presentation image is played on the presentation image in a manner similar to barrages. In this way, the information amount of the presentation information in the presentation image may be increased without affecting other presentation content in the presentation image.

For example, if there are two pieces of text presentation information, the two pieces of text presentation information are disposed on the top of the presentation image in two rows. Positions of the text presentation information in the presentation sub-images may be sequentially set on the left of the top, the middle of the top, and the right of the top. In this way, a barrage effect that the presentation information moves from left to right of the presentation image may be formed after the foregoing presentation sub-images are synthesized.

In some embodiments, if the text presentation information in step S401 is too much, the presentation sub-images corresponding to all the presentation information group are sequentially synthesized to obtain a presentation image having dynamic presentation information, so that the presentation sub-images in each presentation information group are sequentially presented in the presentation image.

If there are six pieces of text presentation information, every two pieces information are used as a presentation information group. Positions of text presentation information in presentation sub-images in each presentation information group may be sequentially set on the left of the top, the middle of the top, and the right of the top. In this way, a barrage effect that the text presentation information moves from left to right of the presentation image may be formed after the foregoing presentation sub-images in each presentation information group are synthesized. Subsequently, after the presentation sub-images in a presentation information group are completely presented, presentation sub-images in another presentation information group are presented in a same manner. Finally, sequential presentation of the six pieces of text presentation information in the presentation image is completed.

Subsequently, step S207 is performed.

In step S207, the information presentation apparatus sends the presentation image obtained in step S206 to the presentation client for the presentation operation. In this way, a user may view the text presentation information related to the image while viewing the presentation image. Therefore, an operation that the user needs to view the text presentation information by performing another operation is avoided, thereby improving presentation efficiency of the text presentation information. In addition, the image has diversified presentation manners. Therefore, presentation manners of the text presentation information are also diversified by viewing the text presentation information by using the image.

Based on the embodiment shown in FIG. 2, in the information presentation method in this embodiment, text presentation information is effectively filtered, and the text presentation information is presented by using a dynamic presentation image, thereby further improving the presentation efficiency of the text presentation information.

Figure 5:
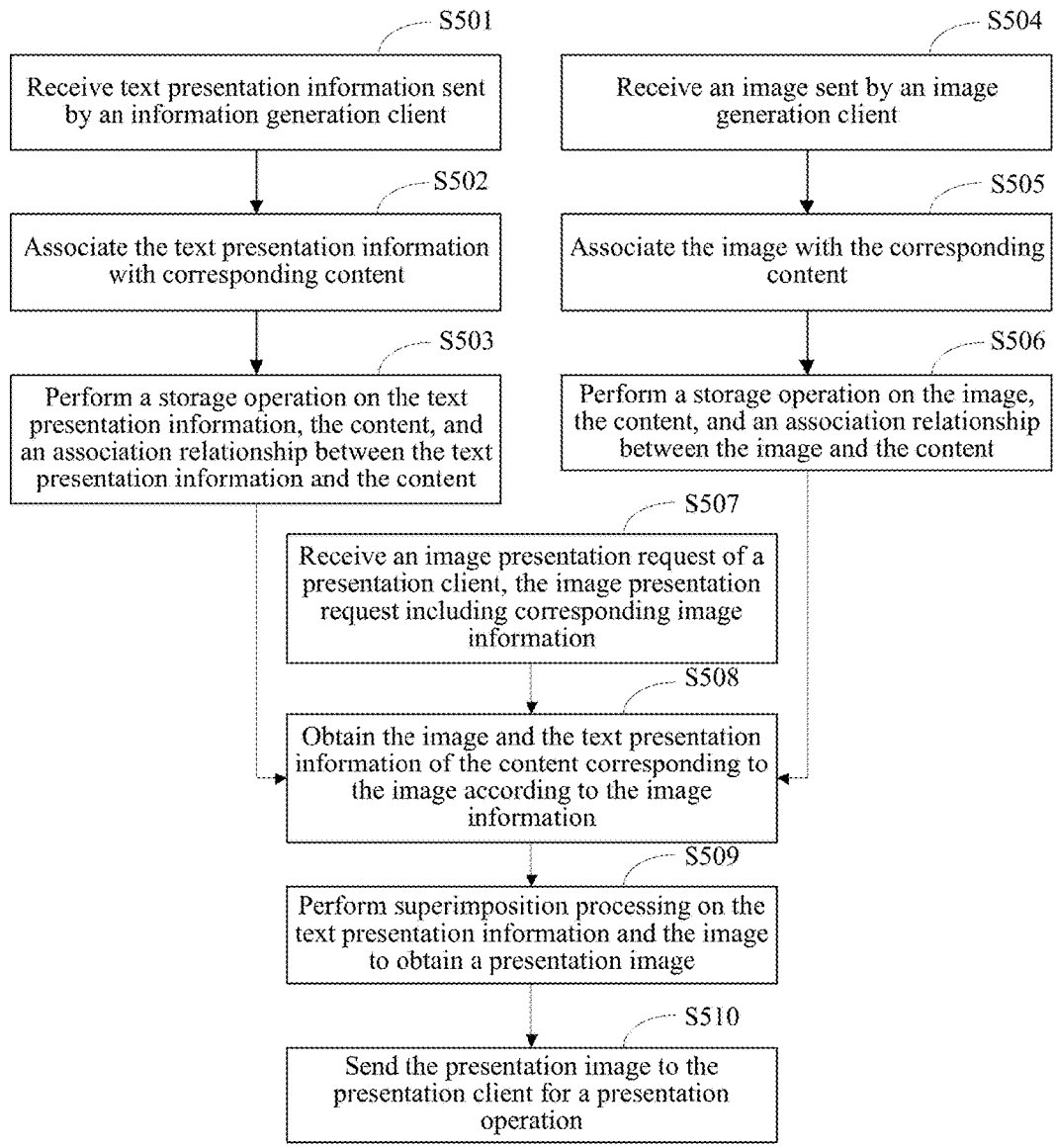
FIG. 5 is another flowchart of an information presentation method according to an embodiment of this application.

Referring to FIG. 5, FIG. 5 is another flowchart of an information presentation method according to an embodiment of this application. The information presentation method in this embodiment may be implemented by using the foregoing electronic device. The information presentation method includes the following steps:

Step S501: Receive text presentation information sent by an information generation client.

Step S502: Associate the text presentation information with corresponding content.

Step S503: Perform a storage operation on the text presentation information, the content, and an association relationship between the text presentation information and the content.

Step S504: Receive an image sent by an image generation client.

Step S505: Associate the image with the corresponding content.

Step S506: Perform a storage operation on the image, the content, and an association relationship between the image and the content.

Step S507: Receive an image presentation request of a presentation client, the image presentation request including corresponding image information.

Step S508: Obtain the image and the text presentation information of the content corresponding to the image according to the image information.

Step S509: Perform superimposition processing on the text presentation information and the image to obtain a presentation image.

Step S510: Send the presentation image to the presentation client for a presentation operation.

Detailed procedures of the steps of the information presentation method in this embodiment are described in detail below.

In step S501, an information presentation apparatus receives the text presentation information sent by the information generation client. The information generation client is a client sending the text presentation information. If a user posts corresponding product comment information of a commodity on an e-commerce platform by using the information generation client, the text presentation information may be the foregoing product comment information. Subsequently, step S502 is performed.

In step S502, the information presentation apparatus associates the text presentation information obtained in step S501 with the corresponding content, so as to rapidly find the text presentation information according to the content. The content herein may be a to-be-sold commodity on the e-commerce platform. One piece of content herein may correspond to multiple pieces of presentation information. Subsequently, step S503 is performed.

In step S503, the information presentation apparatus performs a storage operation on the text presentation information, the content, and the association relationship between the text presentation information and the content. Subsequently, step S508 is performed.

In step S504, the information presentation apparatus receives the image sent by the image generation client. The image generation client is a client sending the image, for example, a commodity image of a commodity that is added by a merchant to the e-commerce platform by using the image generation client. Subsequently, step S505 is performed.

In step S505, the information presentation apparatus associates the image obtained in step S504 with the corresponding content, so as to rapidly find the content according to the image. The content herein may be a to-be-sold commodity on the e-commerce platform. One piece of content herein may correspond to multiple images. Subsequently, step S506 is performed.

In step S506, the information presentation apparatus performs a storage operation on the image, the content, and the association relationship between the image and the content. Subsequently, step S508 is performed.

In step S507, the information presentation apparatus receives the image presentation request of the presentation client. The presentation client herein is a client requesting to view the image. For example, a user views commodity images on an e-commerce platform by using the presentation client. The image presentation request is a request requesting to view the image. The image presentation request may include the image information such as a website of the corresponding image. Subsequently, step S508 is performed.

In step S508, the information presentation apparatus obtains the corresponding image according to the image information obtained in step S507; subsequently, obtains the content corresponding to the image according to the image, and according to the image, the content, and the association relationship between the image and the content that are stored in step S506; and then obtains the text presentation information corresponding to the content according to the content and the text presentation information, the content, and the association relationship between the text presentation information and the content that are stored in step S503. The content herein may be a to-be-sold commodity on the e-commerce platform. The image herein may be a commodity image of the to-be-sold commodity on the e-commerce platform. The text presentation information may be product comment information corresponding to the commodity image. Herein, the corresponding text presentation information is obtained in a sequence of image-content-presentation information, so that the obtained text presentation information can be more accurate and complete. Subsequently, step S509 is performed.

In step S509, the information presentation apparatus performs superimposition processing on the text presentation information and the image that are obtained in step S508. That is, the text presentation information is directly disposed on the image. In some embodiments, the text presentation information is disposed in a position not affecting a presentation effect of the image, to obtain the corresponding presentation image. Subsequently, step S510 is performed.

In step S510, the information presentation apparatus sends the presentation image obtained in step S509 to the presentation client for the presentation operation. In this way, a user may view the text presentation information of the content corresponding to the image while viewing the presentation image. Therefore, an operation that the user needs to view the text presentation information by performing another operation is avoided, thereby improving presentation efficiency of the text presentation information. In addition, the image has diversified presentation manners. Therefore, presentation manners of the text presentation information are also diversified by viewing the text presentation information by using the image.

Based on the embodiment shown in FIG. 5, in the information presentation method in this embodiment, the presentation content and the image are separately associated with the content, so that the presentation content may be associated with multiple related images, thereby further improving the presentation efficiency of the presentation information.

Figure 6:
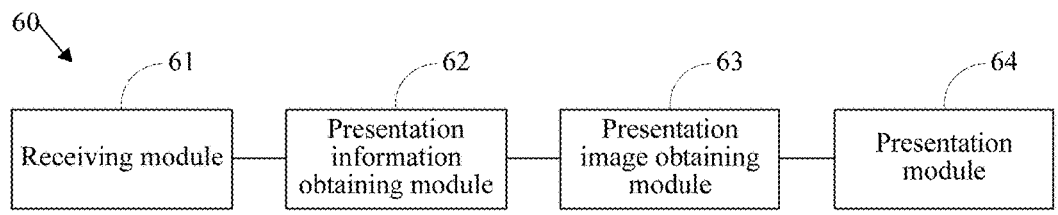
FIG. 6 is a schematic structural diagram of an information presentation apparatus according to an embodiment of this application.

This application further provides an information presentation apparatus. Referring to FIG. 6, FIG. 6 is a schematic structural diagram of an information presentation apparatus according to an embodiment of this application. The information presentation apparatus 60 in this embodiment may be implemented by using the information presentation method shown in FIG. 1. The information presentation apparatus 60 includes: a receiving module 61, a presentation information obtaining module 62, a presentation image obtaining module 63, and a presentation module 64.

The receiving module 61 is configured to receive an image presentation request of a presentation client, the image presentation request including corresponding image information. The presentation information obtaining module 62 is configured to obtain an image and text presentation information corresponding to the image from a product promotion platform according to the image information. The presentation image obtaining module 63 is configured to perform superimposition processing on the text presentation information and the image to obtain a presentation image, where the presentation image includes the text presentation information. The presentation module 64 is configured to send the presentation image to the presentation client for a presentation operation.

When the information presentation apparatus 60 in this embodiment is being used, the receiving module 61 first receives the image presentation request of the presentation client. The presentation client herein is a client requesting to view the image. For example, a user scans commodity images on an e-commerce platform by using the presentation client. The image presentation request is a request requesting to view the image. The image presentation request may include the image information such as a website of the corresponding image.

Subsequently, the presentation information obtaining module 62 obtains the corresponding image from the product promotion platform according to the image information obtained by the receiving module 61; and subsequently, obtains the text presentation information corresponding to the image according to the image. The image herein may be a commodity image on an e-commerce platform. The text presentation information may be commodity information (for example, prices or sizes), related certification information (for example, certification label information of a seller and certification label information of a commodity), and filtered or unfiltered product comment information (for example, positive comment information or negative comment information) that corresponds to the commodity image.

Then, the presentation image obtaining module 63 performs superimposition processing on the text presentation information and the image that are obtained by the presentation information obtaining module 62. That is, the text presentation information is directly disposed on the image. In some embodiments, the text presentation information is disposed in a position not affecting a presentation effect of the image to obtain the corresponding presentation image. The text presentation information is used to present related information of the product in the image.

Finally, the presentation module 64 sends the presentation image obtained by the presentation image obtaining module 63 to the presentation client for the presentation operation. In this way, a user may view the text presentation information related to the image while viewing the presentation image. Therefore, an operation that the user needs to view the text presentation information by performing another operation is avoided, thereby improving presentation efficiency of the text presentation information. In addition, the image has diversified presentation manners. Therefore, presentation manners of the text presentation information are also diversified by viewing the text presentation information by using the image.

In the information presentation apparatus in this embodiment, presentation information is synthesized on a corresponding image for presentation, thereby improving presentation efficiency of the presentation information, enriching presentation manners, and relatively well preventing information release of forged and fake commodities.

Figure 7:
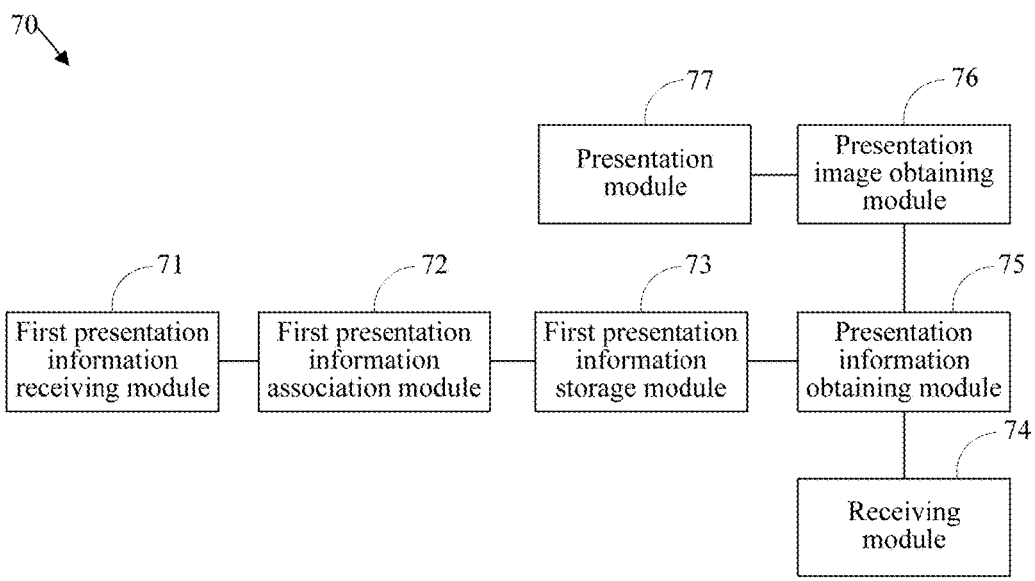
FIG. 7 is another schematic structural diagram of an information presentation apparatus according to an embodiment of this application.

Referring to FIG. 7, FIG. 7 is another schematic structural diagram of an information presentation apparatus according to an embodiment of this application. The information presentation apparatus in this embodiment may be implemented by using the information presentation method shown in FIG. 2. The information presentation apparatus 70 in this embodiment includes: a first presentation information receiving module 71, a first presentation information association module 72, a first presentation information storage module 73, a receiving module 74, a presentation information obtaining module 75, a presentation image obtaining module 76, and a presentation module 77.

The first presentation information receiving module 71 is configured to receive text presentation information sent by an information generation client; the first presentation information association module 72 is configured to associate the text presentation information with the corresponding image; the first presentation information storage module 73 is configured to perform a storage operation on the text presentation information, the image, and an association relationship between the text presentation information and the image.

Figure 8:
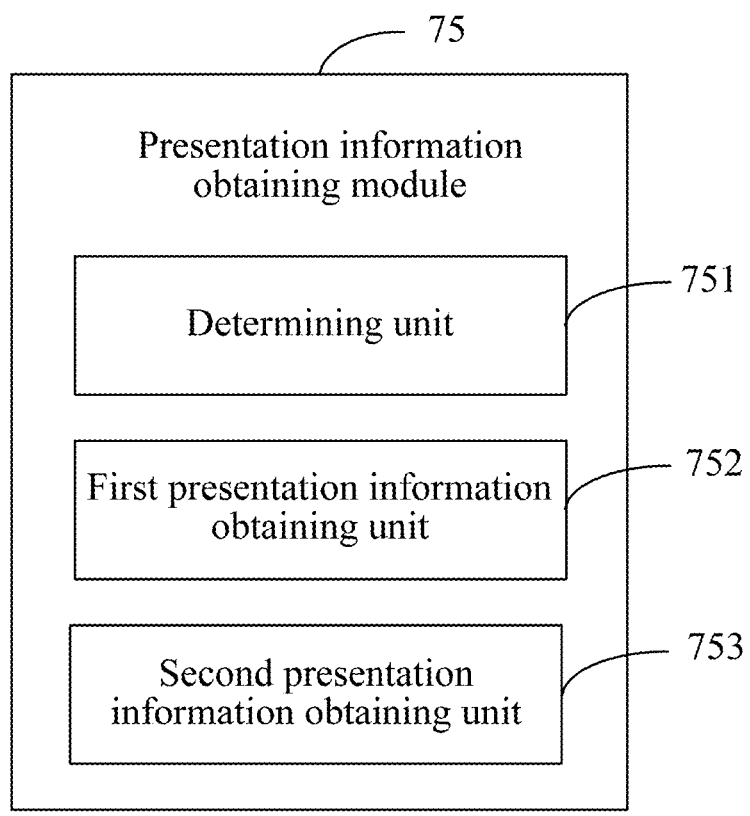
FIG. 8 is a schematic structural diagram of a presentation information obtaining module of an information presentation apparatus according to an embodiment of this application.

Referring to FIG. 8, FIG. 8 is a schematic structural diagram of a presentation information obtaining module of an information presentation apparatus according to an embodiment of this application. The presentation information obtaining module 75 includes: a determining unit 751, a first presentation information obtaining unit 752, and a second presentation information obtaining unit 753.

The determining unit 751 is configured to determine whether an information amount of text presentation information is greater than or equal to a preset value. The first presentation information obtaining unit 752 is configured to: if the information amount of the text presentation information is greater than or equal to the preset value, obtain text presentation information whose information amount is of the preset value. The second presentation information obtaining unit 753 is configured to: if the information amount of the text presentation information is less than the preset value, obtain all the text presentation information.

Figure 9:
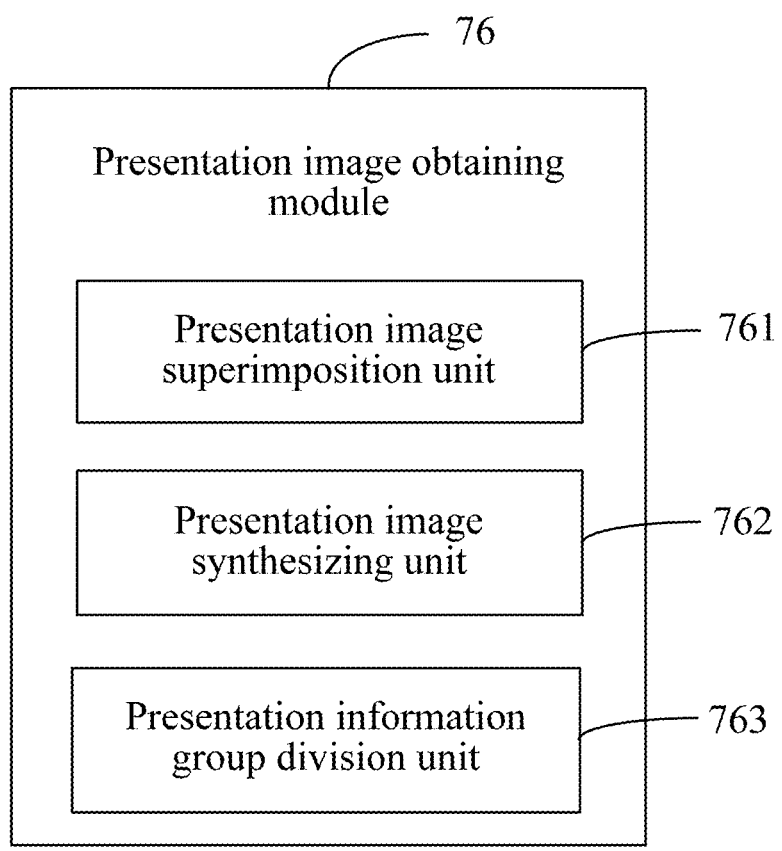
FIG. 9 is another schematic structural diagram of a presentation image obtaining module of an information presentation apparatus according to an embodiment of this application.

Referring to FIG. 9, FIG. 9 is a schematic structural diagram of a presentation image obtaining module of an information presentation apparatus according to an embodiment of this application. The presentation image obtaining module 76 includes: a presentation image superimposition unit 761, a presentation image synthesizing unit 762, and a presentation information group division unit 763.

The presentation image superimposition unit 761 is configured to: superimpose text presentation information on the surface of an image in a dynamic manner to obtain multiple presentation sub-images, where text presentation information on each presentation sub-image has a different position. The presentation image synthesizing unit 762 is configured to synthesize the multiple presentation sub-images to obtain a presentation image having dynamic text presentation information. The presentation information group division unit 763 is configured to divide all the text presentation information into multiple presentation information groups.

When the information presentation apparatus 70 in this embodiment is being used, the first presentation information receiving module 71 first receives the text presentation information sent by an information generation client. The information generation client is a client sending the text presentation information. If a user posts corresponding product comment information of a commodity image on an e-commerce platform by using the information generation client, the text presentation information may be the foregoing product comment information.

Subsequently, the first presentation information association module 72 associates the text presentation information obtained by the first presentation information receiving module 71 with a corresponding image, so as to rapidly find the text presentation information according to the image.

Then, the first presentation information storage module 73 performs a storage operation on the presentation information, the image, and an association relationship between the text presentation information and the image.

In this way, the storage process of the text presentation information, the image, and the association relationship between the text presentation information and the image is completed.

The receiving module 74 receives an image presentation request of a presentation client. The presentation client herein is a client requesting to view the image. For example, a user scans commodity images on an e-commerce platform by using the presentation client. The image presentation request is a request requesting to view the image. The image presentation request may include the image information such as a website of the corresponding image.

Subsequently, the presentation information obtaining module 75 obtains the corresponding image according to the image information obtained by the receiving module 74; and subsequently, obtains the text presentation information corresponding to the image according to the image, and according to the text presentation information, the image, and the association relationship between the text presentation information and the image that are obtained by the first presentation information storage module 73. The image herein may be a commodity image on an e-commerce platform. The text presentation information may be commodity information (for example, prices or sizes), related certification information (for example, certification label information of a seller and certification label information of a commodity), and filtered or unfiltered product comment information (for example, positive comment information or negative comment information) that corresponds to the commodity image.

In some embodiments, the determining unit 751 of the text presentation information obtaining module 75 determines whether an information amount of the text presentation information is greater than or equal to a preset value.

If the information amount of the text presentation information is greater than or equal to the preset value, the information amount of the text presentation information is too large, and the text presentation information cannot be completely presented by using a presentation image. Therefore, the first presentation information obtaining unit 752 only obtains text presentation information whose information amount is of the preset value. The preset value herein may be set according to a specific requirement of a user or a maintenance engineer of an e-commerce platform. To improve effectiveness of the text presentation information, the first presentation information obtaining unit 752 preferentially obtains text presentation information nearest to a current time.

If the information amount of the text presentation information is less than the preset value, the second presentation information obtaining unit 753 obtains all the text presentation information.

Then, the presentation image obtaining module 76 performs superimposition processing on the text presentation information and the image that are obtained by the text presentation information obtaining module 75. That is, the text presentation information is directly disposed on the image to obtain a corresponding presentation image. The text presentation information is used to present related information of the product in the image. This is specifically:

The presentation image superimposition unit 761 of the presentation image obtaining module 76 superimposes the text presentation information on the surface of the image in a dynamic manner to obtain multiple presentation sub-images, where text presentation information on each presentation sub-image has a different position. In some embodiments, if the text presentation information is too much, and cannot be completely presented on the image, the presentation information group division unit 763 of the presentation image obtaining module 76 may divide the text presentation information into multiple presentation information groups; and subsequently, the presentation image superimposition unit 761 of the presentation image obtaining module 76 superimposes text presentation information in each presentation information group on the surface of the image in a dynamic manner to obtain multiple presentation sub-images corresponding to the presentation information group.

The presentation image synthesizing unit 762 of the presentation image obtaining module 76 synthesizes the multiple presentation sub-images, that is, synthesizes the multiple presentation sub-images into a presentation image having dynamic presentation information. Text presentation information on each presentation image has a different position. Therefore, the presentation information in the presentation image is played on the presentation image in a manner similar to barrages. In this way, the information amount of the text presentation information in the presentation image may be increased without affecting other presentation content in the presentation image. In some embodiments, if the text presentation information is too much, the presentation image synthesizing unit 762 sequentially synthesizes the presentation sub-images corresponding to all the presentation information groups to obtain a presentation image having dynamic text presentation information, so that the presentation sub-images in each presentation information group are sequentially presented in the presentation image.

Finally, the presentation module 77 sends the presentation image obtained by the presentation image obtaining module to the presentation client for the presentation operation. In this way, a user may view the text presentation information related to the image while viewing the presentation image. Therefore, an operation that the user needs to view the text presentation information by performing another operation is avoided, thereby improving presentation efficiency of the text presentation information. In addition, the image has diversified presentation manners. Therefore, presentation manners of the text presentation information are also diversified by viewing the text presentation information by using the image.

Based on the foregoing embodiment, in the information presentation apparatus in this embodiment, text presentation information is effectively filtered, and the text presentation information is presented by using a dynamic presentation image, thereby further improving the presentation efficiency of the text presentation information.

Figure 10:
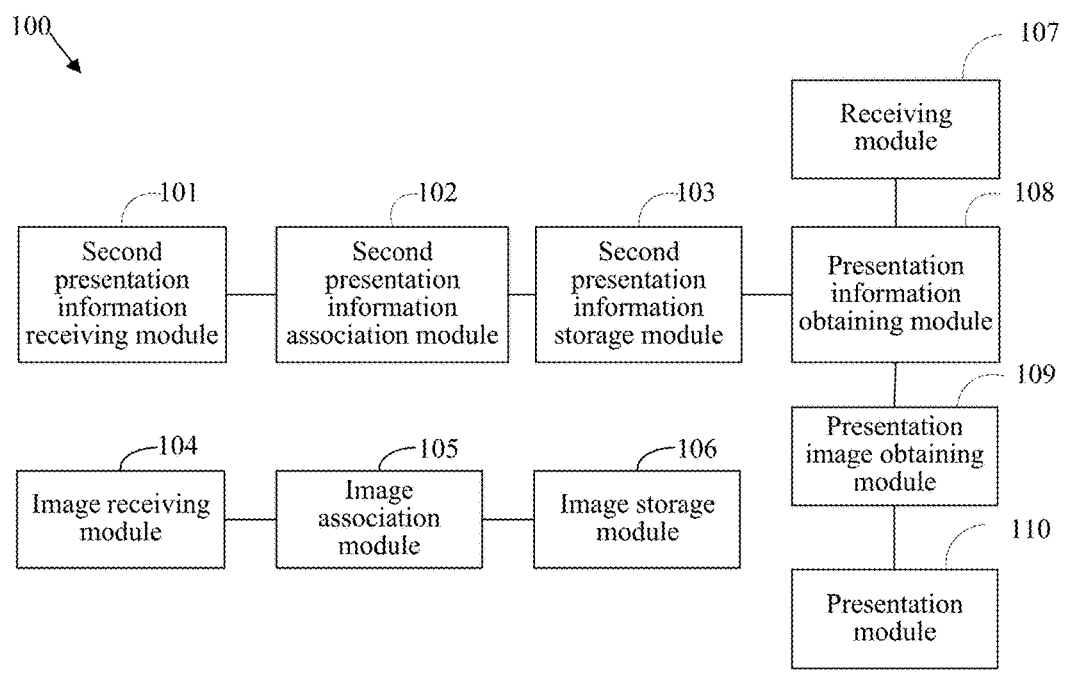
FIG. 10 is a schematic structural diagram of an information presentation apparatus according to an embodiment of this application.

Referring to FIG. 10, FIG. 10 is a schematic structural diagram of an information presentation apparatus according to an embodiment of this application. The information presentation apparatus 100 in this embodiment includes: a second presentation information receiving module 101, a second presentation information association module 102, a second presentation information storage module 103, an image receiving module 104, an image association module 105, an image storage module 106, a receiving module 107, a presentation information obtaining module 108, a presentation image obtaining module 109, and a presentation module 110.

The second presentation information receiving module 101 is configured to receive presentation information sent by an information generation client. The second presentation information association module 102 is configured to associate the presentation information with corresponding content. The second presentation information storage module 103 is configured to perform a storage operation on the text presentation information, the content, and an association relationship between the text presentation information and the content.

The image receiving module 104 is configured to receive an image sent by an image generation client; the image association module 105 is configured to associate the image with the corresponding content; the image storage module 106 is configured to perform a storage operation on the image, the content, and the association relationship between the image and the content.

The receiving module 107 is configured to receive an image presentation request of a presentation client, the image presentation request including corresponding image information. The presentation information obtaining module 108 is configured to obtain the image and the text presentation information of the content corresponding to the image according to the image information. The presentation image obtaining module 109 is configured to perform superimposition processing on the text presentation information and the image to obtain a presentation image, where the presentation image includes the text presentation information. The presentation module 110 is configured to send the presentation image to the presentation client for a presentation operation.

When the information presentation apparatus 100 in this embodiment is being used, the second presentation information receiving module 101 first receives the text presentation information sent by the information generation client. The information generation client is a client sending the text presentation information. If a user posts corresponding product comment information of a commodity on an e-commerce platform by using the information generation client, the text presentation information may be the foregoing product comment information.

Subsequently, the second presentation information association module 102 associates the text presentation information obtained by the second presentation information receiving module 101 with the corresponding content, so as to rapidly find the text presentation information according to the content. The content herein may be a to-be-sold commodity on the e-commerce platform. One piece of content herein may correspond to multiple pieces of presentation information.

Then, the second presentation information storage module 103 performs a storage operation on the text presentation information, the content, and the association relationship between the text presentation information and the content.

In this way, the storage process of the text presentation information, the content, and the association relationship between the presentation information and the content is completed.

In addition, the image receiving module 104 receives the image sent by the image generation client. The image generation client is a client sending the image, for example, a commodity image of a commodity that is added by a merchant to the e-commerce platform by using the image generation client.

Subsequently, the image association module 105 associates the image obtained by the image receiving module 104 with the corresponding content, so as to rapidly find the content according to the image. The content herein may be a to-be-sold commodity on the e-commerce platform. One piece of content herein may correspond to multiple images.

Then, the image storage module 106 performs a storage operation on the image, the content, and an association relationship between the image and the content.

In this way, the storage process of the image, the content, and the association relationship between the image and the content is completed.

The receiving module 107 receives the image presentation request of the presentation client. The presentation client herein is a client requesting to view the image. For example, a user scans commodity images on an e-commerce platform by using the presentation client. The image presentation request is a request requesting to view the image. The image presentation request may include the image information such as a website of the corresponding image.

Subsequently, the presentation information obtaining module 108 obtains the corresponding image according to the image information obtained by the receiving module; subsequently, obtains the content corresponding to the image according to the image and the image, the content, and the association relationship between the image and the content that are stored in the image storage module; and then, obtains the text presentation information corresponding to the content according to the content and the text presentation information, the content, and the association relationship between the text presentation information and the content that are stored in the second presentation information storage module. The content herein may be a to-be-sold commodity on the e-commerce platform. The image herein may be a commodity image of the to-be-sold commodity on the e-commerce platform. The text presentation information may be product comment information corresponding to the commodity image. Herein, the corresponding text presentation information is obtained in a sequence of image-content-text presentation information, so that the obtained text presentation information can be more accurate and complete.

Then, the presentation image obtaining module 109 performs superimposition processing on the text presentation information and the image that are obtained by the presentation information obtaining module 108. That is, the text presentation information is directly disposed on the image. In some embodiments, the text presentation information is disposed in a position not affecting a presentation effect of the image to obtain the corresponding presentation image.

Finally, the presentation module 110 sends the presentation image obtained by the presentation image obtaining module 109 to the presentation client for the presentation operation. In this way, a user may view the text presentation information of the content corresponding to the image while viewing the presentation image. Therefore, an operation that the user needs to view the text presentation information by performing another operation is avoided, thereby improving presentation efficiency of the text presentation information. In addition, the image has diversified presentation manners. Therefore, presentation manners of the text presentation information are also diversified by viewing the presentation information by using the image.

Based on the foregoing embodiment, in the information presentation apparatus in this embodiment, the presentation content and the image are separately associated with the content, so that the presentation content may be associated with multiple related images, thereby further improving the presentation efficiency of the presentation information.

Specific working principles of the information presentation method and the information presentation apparatus of this application are described below by using two specific embodiments.

Figure 11A:
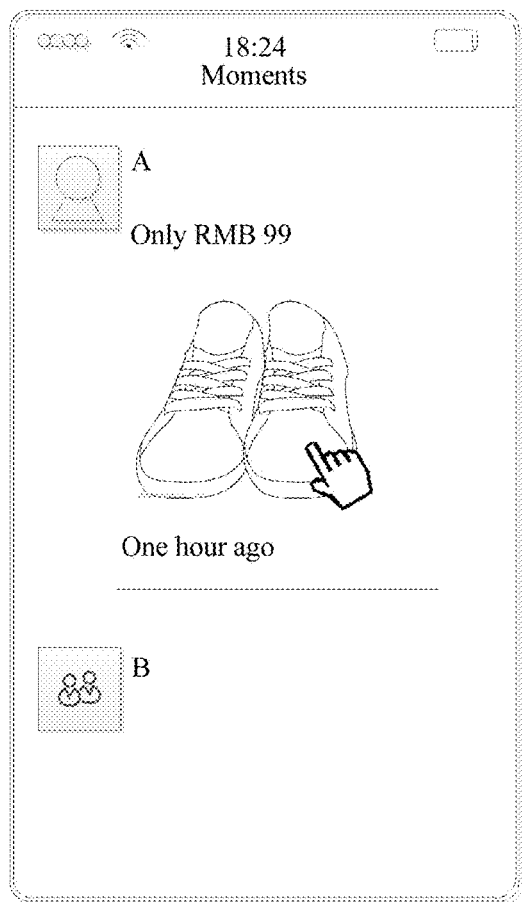
FIG. 11A and FIG. 11B are schematic diagrams of use of an information presentation method and an information presentation apparatus according to an embodiment of this application.
Figure 11B:
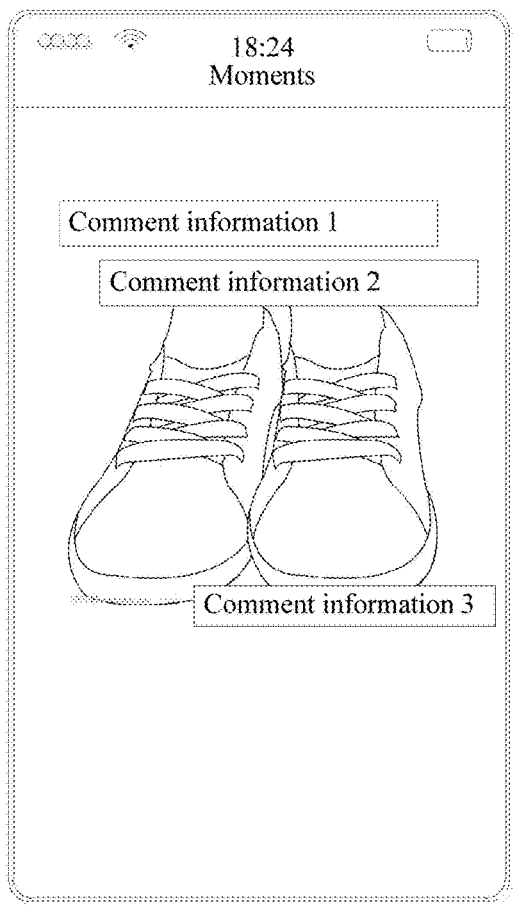

Referring to FIG. 11A and FIG. 11B, FIG. 11A and FIG. 11B are schematic diagrams of use of a first specific embodiment of an information presentation method and an information presentation apparatus according to this application. In this embodiment, interaction between a mobile phone and a WeChat server is used as an example.

In this specific embodiment, a user first scans commodity information in Moments by using a mobile phone. Details are as shown in FIG. 11A.

If interested in the shoes in FIG. 11A, the user may send an image presentation request to the WeChat server by clicking the image of the shoes in FIG. 11A, to obtain the related image of the shoes.

Subsequently, the WeChat server obtains information about the shoes corresponding to the image according to the image presentation request, and then, obtains product comment information of the shoes by using the information about the shoes. Certainly, herein, the product comment information of the shoes may be directly associated with the image of the shoes, that is, the product comment information of the shoes is directly obtained by using the image.

Then, the WeChat server synthesizes the product comment information on the image to obtain a corresponding presentation image. The presentation image is a dynamic presentation image. The product comment information is presented on the presentation image in cycles in a manner similar to barrages, as shown in FIG. 11B.

In this way, the user also views the product comment information of the shoes while viewing the image of the shoes, thereby improving commodity scanning efficiency of the user and presentation efficiency of the commodity information.

Figure 12:
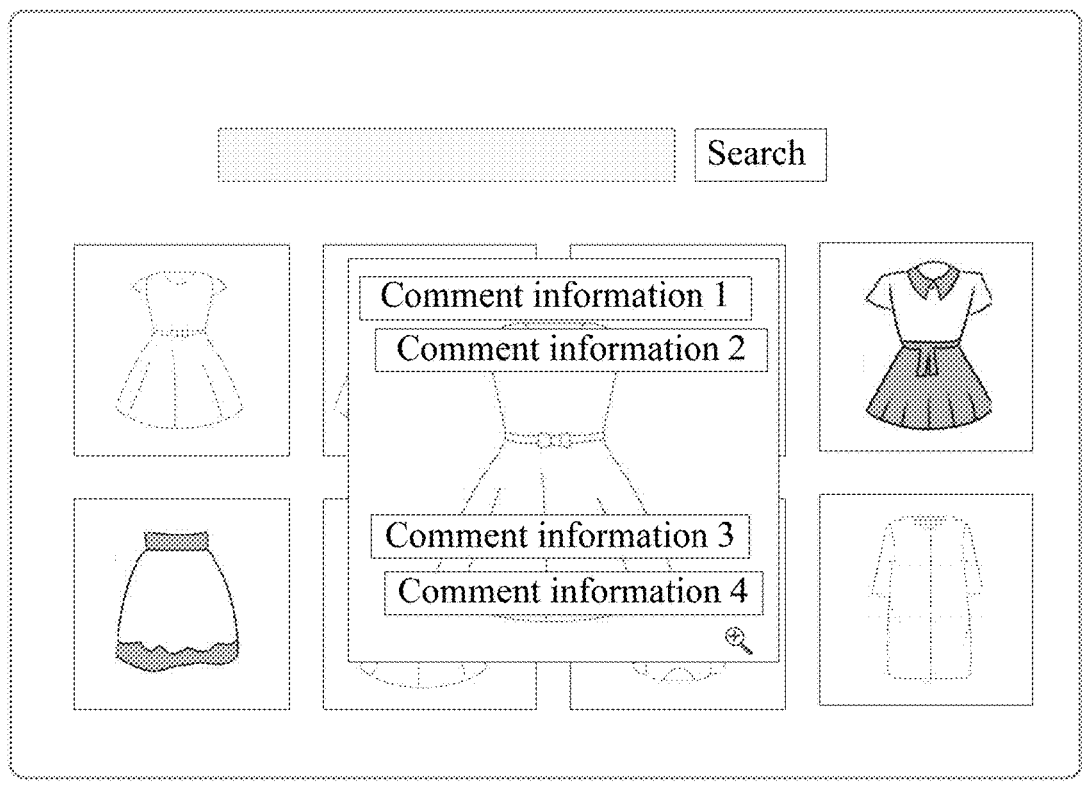
FIG. 12 is another schematic diagram of use of an information presentation method and an information presentation apparatus according to an embodiment of this application.

Referring to FIG. 12, FIG. 12 is a schematic diagram of use of an information presentation method and an information presentation apparatus according to an embodiment of this application. In this embodiment, interaction between a desktop computer and an e-commerce server is used as an example.

In this specific embodiment, a user first scans commodity information on an e-commerce server by using a desktop computer.

If interested in clothes, the user may put the mouse pointer on a micrograph of the commodity. In this way, the desktop computer sends an image presentation request of an image corresponding to the micrograph to an e-commerce server.

Subsequently, the e-commerce server obtains information about the commodity corresponding to the image according to the image presentation request, and then, obtains product comment information of the commodity by using the information about the commodity.

Then, the e-commerce server synthesizes the product comment information on the image to obtain a corresponding presentation image. The presentation image is a dynamic presentation image. The product comment information is presented on the presentation image in cycles in a manner similar to barrages, as shown in FIG. 12.

In this way, the user also views the product comment information of the commodity while viewing the image of the commodity, thereby improving commodity scanning efficiency of the user and presentation efficiency of the commodity information.

According to the information presentation method and the information presentation apparatus in this application, text presentation information is synthesized a corresponding image for presentation, thereby improving presentation efficiency of the text presentation information, enriching presentation manners and the presentation content, relatively well reminding a user of information about forged and fake commodities, and resolving technical problems that presentation efficiency of an existing information presentation method and information presentation apparatus is relatively low, and presentation manners and presentation content are relatively simple.

Terms such as "component", "module", "system", "interface", and "progress" that are used in this application are used to indicate computer-related entities: hardware, firmware, combinations of hardware and software, software, or software being executed. For example, a component may be, but not limited to, a process running on a processor, a processor, an object, an executable application, an executed thread, a program, and/or a computer. With reference to the drawings, an application running on a controller and the controller may both be components. One or more components may be in an executed process and/or thread and the components may be located on one computer and/or distributed between or among two or more computers.

Moreover, the subject required to be protected may be implemented by using standard programming and/or an engineering technology to produce software, firmware, hardware, or any other combination thereof, to control a computer to implement a method, an apparatus, or an article of manufacture of the disclosed subject. The term "product" used in this application is intended to cover a computer program that can be accessed from any computer-readable component, carrier, or medium. Certainly, a person skilled in the art may be aware that modifications may be performed on the configuration without departing from the scope and spirit of the subject required to be protected.

Figure 13:
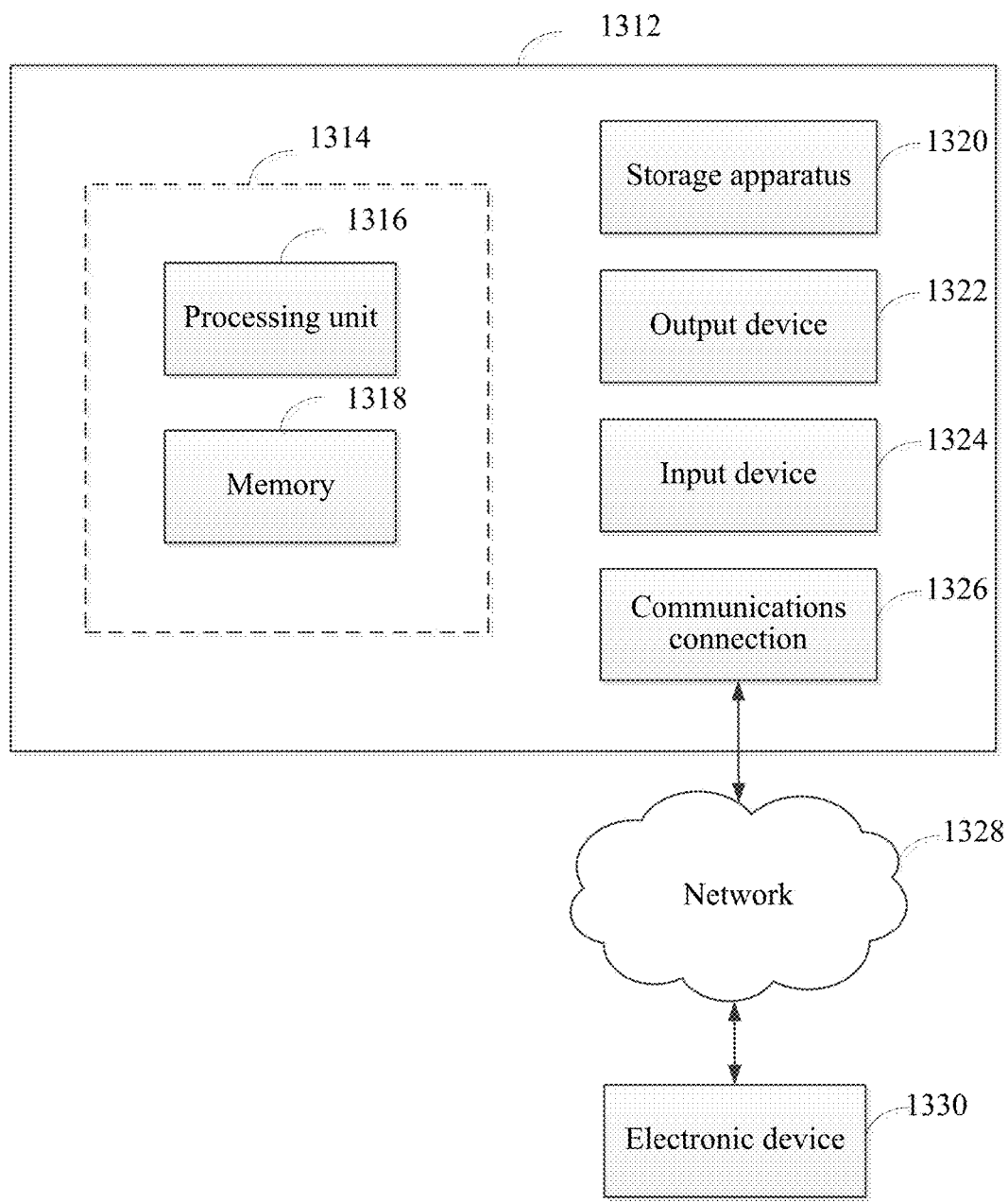
FIG. 13 is a schematic structural diagram of a working environment of an electronic device in which an information presentation apparatus is located according to an embodiment of this application.

FIG. 13 and the later discussion provide a simple and short description of a working environment of an electronic device in which the information presentation apparatus described in this application is located. The working environment shown in FIG. 13 is only an instance of proper working environments, and is not intended to indicate use of the working environment or constitute any limitation to the scope of functions. The instance of the electronic device 1312 includes, but is not limited to: a personal computer, a server computer, a portable or laptop device, a mobile device (for example, a mobile phone, a personal digital assistant (PDA), and a media player), a multiprocessor system, a consumption-based electronic device, a small computer, a mainframe computer, a distributed computing environment including any one of the foregoing systems or devices, and the like.

Although not required, an embodiment is described in a general background in which "computer-readable instruction" is executed by one or more electronic devices. The computer-readable instruction may be distributed by a computer-readable medium (which is discussed in the following). The computer-readable instruction may be implemented as a program module, for example, a function, an object, an application programming interface (API), or a data structure for executing a particular task or implementing a particular abstract data type. Typically, functions of the computer-readable instruction may be randomly combined or distributed in various environments.

FIG. 13 shows instances of one or more electronic devices 1312 including the information presentation apparatus in this application. In a configuration, the electronic device 1312 includes at least one processing unit 1316 and a memory 1318. The memory 1318 may be volatile or transitory (for example, a RAM), or non-volatile or non-transitory (for example, a ROM or a flash), or a combination thereof according to a specific configuration or type of the electronic device. The configuration is represented by a dashed line 1314 in FIG. 13.

In another embodiment, the electronic device 1312 may include an attached feature and/or function. For example, the device 1312 may further include an attached storage apparatus (for example, removable and/or non-removable), including to not limited to a magnetic storage apparatus, an optical storage apparatus, and the like. Such an attached storage apparatus is represented by a storage apparatus 1320 in FIG. 13. In an embodiment, the computer-readable instruction used to implement one or more embodiments provided in this specification may be in the storage apparatus 1320. The storage apparatus 1320 may further store another computer-readable instruction used to implement an operating system, an application program, and the like. The computer-readable instruction may be loaded into the memory 1318 and executed by, for example, the processing unit 1316.

The term "computer-readable medium" includes a computer storage medium. The computer storage medium includes volatile, non-volatile, removable, and non-removable media implemented by using any method or technology used for storing information such as a computer-readable instruction or other data. The memory 1318 and the storage apparatus 1320 are instances of the computer storage medium. The computer storage medium includes, but is not limited to, a RAM, a ROM, an EEPROM, a flash, or another memory technology, a CD-ROM, a digital versatile disc (DVD), or another optical storage apparatus, a cassette, a tape, a disk storage apparatus, or another magnetic storage device, or any other mediums that may be configured to store expected information and that may be accessed by the electronic device 1312. Any computer storage medium may be a part of the electronic device 1312.

The electronic device 1312 may further include a communications connection 1326 allowing the electronic device 1312 to communicate with another device. The communications connection 1326 may include, but is not limited to, a modem, a network interface card (NIC), an integrated network interface, a radio frequency transmitter/receiver, an infrared port, a USB connection, or another interface configured to connect the electronic device 1312 to another electronic device. The communications connection 1326 may include a wired connection or a wireless connection. The communications connection 1326 may transmit and/or receive a communications medium.

The term "computer-readable medium" may include a communications medium. The communications medium typically includes the computer-readable instruction or other data in "a modulated data signal", such as a carrier or another transmission mechanism, and includes any information transmission medium. The term "modulated data signal" may include such a signal: one or more signal features are set or changed in a manner for encoding information into the signal.

The electronic device 1312 may include an input device 1324, for example, a keyboard, a mouse, a pen, a voice input device, a touch input device, an infrared camera, a video input device, and/or any other input device. The device 1312 may include an output device 1322, for example, one or more displays, a speaker, a printer, and/or any other output device. The input device 1324 and the output device 1322 may be connected to the electronic device 1112 in a wired manner, a wireless manner, or any combination thereof. In an embodiment, an input device or an output device from another electronic device may be used as the input device 1324 or the output device 1322 of the electronic device 1312.

Components of the electronic device 1312 may be connected by means of various interconnections (for example, a bus). Such interconnections may include a peripheral component interconnection (PCI) (for example, a rapid PCI), a universal serial bus (USB), a live line (IEEE 1394), an optical bus structure, and the like. In another embodiment, the components of the electronic device 1312 may be interconnected by using a network. For example, the memory 1318 may include multiple physical memory units that are located in different physical positions and that are interconnected by using the network.

A person skilled in the art may realize that storage devices configured to store computer-readable instructions may be distributed across networks. For example, an electronic device 1330 that may be accessed by using a network 1328 may store computer-readable instructions used to implement one or more embodiments provided in this application. The electronic device 1312 may access the electronic device 1330 and download some computer-readable instructions or all the computer-readable instructions for execution. Alternatively, the electronic device 1312 may download multiple computer-readable instructions according to needs, or some instructions may be executed in the electronic device 1312, and some instructions may be executed in the electronic device 1330.

This specification provides various operations of embodiments. In an embodiment, the one or more operations may constitute one or more computer-readable instructions stored in a computer-readable medium, and when executed by an electronic device, the computer-readable instructions cause a computing device to perform the operations. A sequence for describing some or all operations shall not be interpreted as implying that the operations are definitely sequentially related. A person skilled in the art will understand an alternative sequence having the benefits of this specification. Moreover, it should be understood that not all operations are mandatory in each embodiment provided in this specification.

For example, the term "or" used in this application is intended to include the inclusive "or" rather than the exclusive "or". That is, unless specified otherwise or clear from the context, "X uses A or B" refers to any of natural inclusive permutations. That is, if X uses A, X uses B, or X uses both A and B, "X uses A or B" is satisfied in any one of the foregoing examples.

Furthermore, although the present disclosure is shown and described by using one or more implementations, a person skilled in the art may conceive of equivalent variations and modifications based on reading and understanding of this specification and the accompany drawings. The present disclosure includes all such variations and modifications, and is only limited by the scope of the appended claims. Particularly, about the various functions executed by the foregoing components (such as elements and resources), terms used to describe such components are intended to correspond to any component (unless indicated otherwise) executing specified functions of the components (for example, the components are equivalent in functions), even though structures of the functions are not equivalent to the disclosed structures of functions in the exemplary implementations in this specification shown in this specification. In addition, although particular features of this specification are disclosed with respect to only one of several implementation manners, the features may be combined with one or more other features of other implementation manners that are desirable for and advantageous to a given or particular application. In addition, for terms "include", "have", "contain" or transformations thereof being used in specific implementations or claims, such terms are intended to be inclusive in a manner similar to the term "include".

Functional units according to the embodiments of this application may be integrated in one processing module or exist as separate physical units, or two or more units are integrated in one module. The integrated modules may be implemented in the form of hardware or software functional modules. If implemented in the form of software functional modules and sold or used as independent products, the integrated modules may be stored in a computer-readable storage medium. The storage medium mentioned above may be a read-only memory, a magnetic disk or, an optical disc. The foregoing apparatuses or systems can execute methods in corresponding method embodiments.

In conclusion, although this application has been disclosed through embodiments, the foregoing embodiments are not intended to limit this application. A person of ordinary skill in the art can make various modifications and improvements without departing from the spirit and scope of this application. Therefore, the protection scope of this application should be subject to the scope defined by the claims.

What is claimed is:

1. An information presentation method, comprising:
   receiving, by an information presentation apparatus comprising a memory and a processor in communication with the memory, an image presentation request from a presentation client, the presentation client being configured to present an image, and the image presentation request comprising image information corresponding to the image;
   obtaining, by the information presentation apparatus, the image and text presentation information corresponding to the image from a product promotion platform according to the image information, the text presentation information being used to present comment information of a product in the image;

performing, by the information presentation apparatus, superimposition processing on the text presentation information and the image to obtain a presentation image;

sending, by the information presentation apparatus, the presentation image to the presentation client for a presentation operation; and wherein the performing superimposition processing on the text presentation information and the image to obtain the presentation image comprises:

superimposing, by the information presentation apparatus, the text presentation information on a surface of the image in a dynamic manner to obtain multiple presentation sub-images, wherein the text presentation information on each presentation sub-image has a different position, and synthesizing, by the information presentation apparatus, the multiple presentation sub-images to obtain the presentation image having dynamic text presentation information.

2. The information presentation method according to claim 1, wherein the obtaining the image and the text presentation information corresponding to the image according to the image information further comprises:

determining, by the information presentation apparatus, whether an information amount of the text presentation information is greater than or equal to a preset value;

when the information amount of the text presentation information is determined to be greater than or equal to the preset value, obtaining, by the information presentation apparatus, a portion of the text presentation information whose information amount is of the preset value as the text presentation information; and when the information amount of the text presentation information is determined to be less than the preset value, obtaining, by the information presentation apparatus, all the text presentation information.

3. The information presentation method according to claim 2, wherein:

the portion of the text presentation information whose information amount is of the preset value is text presentation information nearest to a current time.

4. The information presentation method according to claim 1, wherein the superimposing the text presentation information on the surface of the image in the dynamic manner to obtain the multiple presentation sub-images comprises:

dividing, by the information presentation apparatus, the text presentation information into multiple presentation information groups; and superimposing, by the information presentation apparatus, the text presentation information in each presentation information group on the surface of the image in a dynamic manner to obtain the multiple presentation sub-images corresponding to the each presentation information group.

5. The information presentation method according to claim 1, wherein:

the text presentation information further comprises filtered or unfiltered product information and related certification information.

6. The information presentation method according to claim 1, further comprising:

receiving, by the information presentation apparatus, text presentation information sent by an information generation client;

associating, by the information presentation apparatus, the received text presentation information with a corresponding image; and performing, by the information presentation apparatus, a storage operation on the received text presentation information, the corresponding image, and an association relationship between the received text presentation information and the corresponding image.

7. The information presentation method according to claim 1, wherein the obtaining the image and the text presentation information corresponding to the image according to the image information comprises:

obtaining, by the information presentation apparatus, the image and the text presentation information of content corresponding to the image according to the image information.

8. The information presentation method according to claim 7, further comprising:

receiving, by the information presentation apparatus, text presentation information sent by an information generation client;

associating, by the information presentation apparatus, the received text presentation information with corresponding content; and performing, by the information presentation apparatus, a storage operation on the received text presentation information, the corresponding content, and an association relationship between the received text presentation information and the corresponding content.

9. The information presentation method according to claim 7, further comprising:

receiving, by the information presentation apparatus, an image sent by an image generation client;

associating, by the information presentation apparatus, the received image with corresponding content; and performing, by the information presentation apparatus, a storage operation on the received image, the corresponding content, and an association relationship between the received image and the corresponding content.

10. An information presentation apparatus, comprising:
a memory storing instructions;
a processor in communication with the memory, wherein, when the processor executes the instructions, the processor is configured to cause the information presentation apparatus to:

receive an image presentation request from a presentation client, the presentation client being configured to present an image, and the image presentation request comprising image information corresponding to the image, obtain the image and text presentation information corresponding to the image from a product promotion platform according to the image information, the text presentation information being used to present comment information of a product in the image, perform superimposition processing on the text presentation information and the image to obtain a presentation imaged, and send the presentation image to the presentation client for a presentation operation; and wherein, when the processor is configured to cause the information presentation apparatus to perform superimposition processing on the text presentation information and the image to obtain the presentation image, the processor is configured to cause the information presentation apparatus to:

superimpose the text presentation information on a surface of the image in a dynamic manner to obtain multiple presentation sub-images, wherein the text presentation information on each presentation sub-image has a different position, and synthesize the multiple presentation sub-images to obtain the presentation image having dynamic text presentation information.

11. The information presentation apparatus according to claim 10, wherein, when the processor is configured to cause the information presentation apparatus to obtain the image and the text presentation information corresponding to the image from the product promotion platform according to the image information, the processor is configured to cause the information presentation apparatus to:

determine whether an information amount of the text presentation information is greater than or equal to a preset value;

when the information amount of the text presentation information is determined to be greater than or equal to the preset value, obtain a portion of the text presentation information whose information amount is of the preset value as the text presentation information; and when the information amount of the text presentation information is determined to be less than the preset value, obtain all the text presentation information.

12. The information presentation apparatus according to claim 11, wherein:

the portion of the text presentation information whose information amount is of the preset value is text presentation information nearest to a current time.

13. The information presentation apparatus according to claim 10, wherein, when the processor is configured to cause the information presentation apparatus to superimpose the text presentation information on the surface of the image in the dynamic manner to obtain the multiple presentation sub-images, the processor is configured to cause the information presentation apparatus to:

divide the text presentation information into multiple presentation information groups; and superimpose the text presentation information in each presentation information group on the surface of the image in the dynamic manner to obtain the multiple presentation sub-images corresponding to the each presentation information group.

14. The information presentation apparatus according to claim 10, wherein:

the text presentation information further comprises filtered or unfiltered product information and related certification information.

15. The information presentation apparatus according to claim 10, wherein, when the processor executes the instructions, the processor is configured to further cause the information presentation apparatus to:

receive text presentation information sent by an information generation client;

associate the received text presentation information with a corresponding image; and perform a storage operation on the received text presentation information, the corresponding image, and an association relationship between the received text presentation information and the corresponding image.

16. The information presentation apparatus according to claim 10, wherein, when the processor is configured to cause the information presentation apparatus to obtain the image and the text presentation information corresponding to the image from the product promotion platform according to the image information, the processor is configured to cause the information presentation apparatus to:

obtain the image and the text presentation information of content corresponding to the image according to the image information.

17. The information presentation apparatus according to claim 16, wherein, when the processor executes the instructions, the processor is configured to further cause the information presentation apparatus to:

receive text presentation information sent by an information generation client;

associate the received text presentation information with corresponding content; and perform a storage operation on the received text presentation information, the corresponding content, and an association relationship between the received text presentation information and the corresponding content.

18. The information presentation apparatus according to claim 16, wherein, when the processor executes the instructions, the processor is configured to further cause the information presentation apparatus to:

receive an image sent by an image generation client;

associate the received image with corresponding content; and perform a storage operation on the received image, the corresponding content, and an association relationship between the received image and the corresponding content.

* * * * *